March 16, 1937.  H. H. EWARDS  2,073,963
ANTIFRICTION BEARING AND SEAL
Filed May 25, 1935
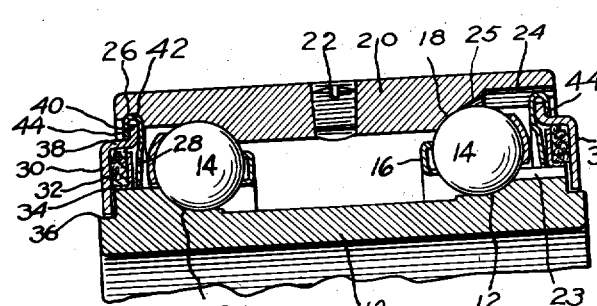
Fig. 1
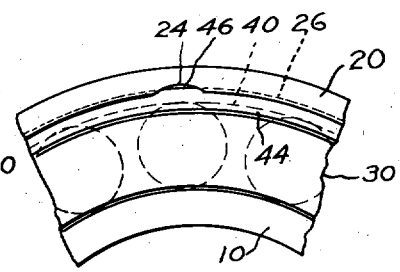
Fig. 2
Fig. 3
Fig. 4
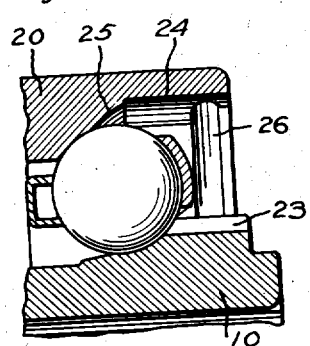
Fig. 5
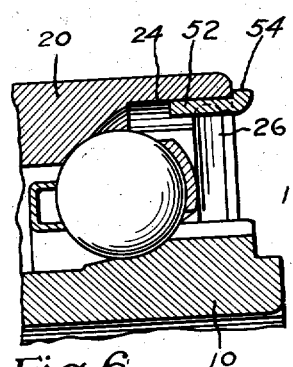
Fig. 6
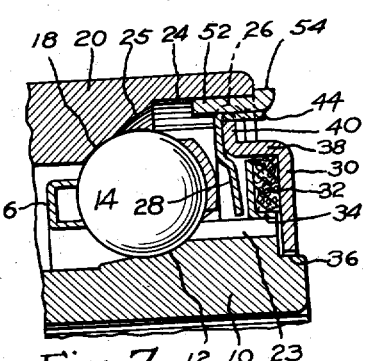
Fig. 7
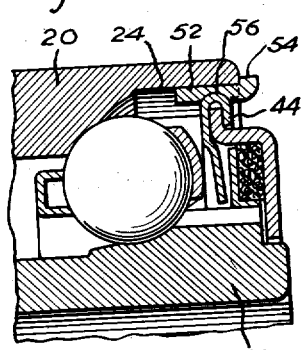
Fig. 8
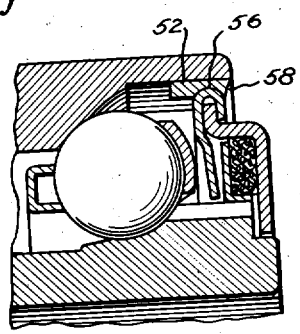
Fig. 9
INVENTOR:
HENRY H. EDWARDS,
BY
Gales P. Moore
HIS ATTORNEY.

Patented Mar. 16, 1937

2,073,963

UNITED STATES PATENT OFFICE 2,073,963

ANTIFRICTION BEARING AND SEAL

Henry H. Edwards, Bristol, Conn., assignor to General Motors Corporation, Detroit, Mich., a corporation of Delaware Application May 25, 1935, Serial No. 23,495

6 Claims. (Cl. 308—187.2)

This invention relates to antifriction bearings and seals and comprises all of the features of novelty herein disclosed. An object of the invention is to provide improved sealing means for retaining lubricant in antifriction bearings and excluding foreign matter therefrom. The invention is especially applicable to antifriction bearings of the type having filling slots through which the rolling elements are introduced and hence another object is to provide improved means for closing such filling slots as well as for closing the remaining space between co-operating race rings. Another object is to provide a simple, low cost construction for closing the filling slot of a bearing race ring without complicating the method of assembling a seal or guard device with the race ring.

To these ends and also to improve generally upon devices of this character, the invention consists in the various matters hereinafter described and claimed. In its broader aspects, the invention is not necessarily limited to the specific construction selected for illustrative purposes in the accompanying drawing in which Fig. 1 is a cross sectional view of a portion of an antifriction bearing illustrating the type to which my improved sealing means is especially applicable.

Fig. 2 is a side elevation of a portion of such bearing.

Fig. 3 is a side elevation, partly in section, of a strip of material for making slugs or fillers.

Fig. 4 is a cross sectional view of the strip.

Fig. 5 is a cross sectional view, enlarged, of a portion of the bearing without the seal.

Fig. 6 is a similar view with a sealing slug in position.

Fig. 7 is a similar view with the sealing slug in position and co-operating seal parts ready for expansion into the slug.

Fig. 8 is a similar view with the seal parts connected and

Fig. 9 is a similar view with the slug cut off.

Although the invention is applicable to antifriction bearings of other types, it is illustrated as applied to a double row ball bearing comprising an inner race ring 10 having angular contact raceways 12 for two rows of rolling elements in the form of balls 14, each row of rolling elements having a suitable cage 16. The balls run on outer angular contact raceways 18 of an outer race ring 20 having a plugged opening 22 for introducing lubricant. In the illustrated bearing, the balls of one row are introduced through filling slots, one slot 23 being in the inner race ring and leading to the raceway 12, the companion slot 24 being in the outer race ring and leading to the raceway 18 or to a secondary slot 25 which leads to the raceway 18. Each end of the outer race ring has a peripheral groove 26 to receive a shield or seal, the seal at the left completing closing the space between the race rings but the one at the right having an opening beyond the periphery of the seal where the outer filling slot 24 intersects the groove 26.

Each of the seals illustrated in Fig. 1 is of a well known type comprising metal washers 28 and 30 spaced apart to receive a felt washer 32 and an angle washer 34, an extension of the washer 30 projecting into a peripheral notch 36 of the inner race ring. The washer 30 has an offset or cupped portion 38 with an outwardly turned flange 40. The washer 28 is inclined or dished to form a capillary angle of about four degrees with the upright leg of the angle washer 34 and its peripheral portion 42 forms a rounded bead which is expanded or crowded into the groove 26 when an annular terminal flap 44 is bent down outside of the flange 40. As indicated in Figs. 1 and 2, an opening 46 is left at the filling slot 24 beyond the periphery of the seal and to close this opening without complicating the structure or method of assembling the seal is one of the objects of this invention.

To close the opening 44, I utilize a slug or filler 52 conveniently cut from an elongated strip 50 of soft metal such as lead, the strip preferably being arcuate or crescent-shaped in cross section. The outer or convex surface has a curvature to fit the filling slot 24 and the inner or concave surface 51 has a curvature to fit the periphery or rim of the annular flap 44 before the latter as bent from the position shown in Fig. 7. The slug or filler 52 preferably has an end or head 54 bent outwardly to engage the end of the race ring 20 to limit entry lengthwise into the filling slot. When the flap 44 is bent down, the washer expands into the groove 26 and into the metal of the slug or filler as indicated in Fig. 8. Thus the sealing washers and the filler are all held firmly to the bearing and present a finished appearance when the head 54 of the slug is cut off as indicated at 58 in Fig. 9.

I claim:

1. In a bearing, a race ring having a filling slot, a filler fitting in the slot, and a sealing device having a portion of a peripheral edge expanded against the filler; substantially as described.

2. In a bearing, a race ring having a filling slot, a filler of soft material fitting in the slot, and a sealing device embedded in the filler; substantially as described.

3. In a bearing, a race ring having a filling slot, a filler of soft material fitting in the slot, a sealing washer secured to the race ring, and a portion of the rim of the washer being embedded in the filler; substantially as described.

4. In a bearing, a race ring having a filling slot leading to a raceway groove, a filler comprising an elongated slug adapted to enter the filling slot lengthwise, and the filler having a head arranged at an angle to the body portion to limit entry of the slug into the slot and to hold the inner end thereof spaced from the raceway groove, and the bearing being closed by a sealing washer having a portion of its periphery embedded in the filler; substantially as described.

5. In a bearing, a filling slot filler comprising an elongated slug of curved cross section adapted to enter a filling slot lengthwise, the slug being of soft metal, and the bearing having an end sealing washer embedded in the slug; substantially as described.

6. In a bearing, a race ring having a transverse filling slot leading to a raceway, the ring also having a peripheral groove opening into the slot, a filler of soft material entering the slot and terminating short of the raceway, and a sealing device closing the end of the bearing and expanded into the groove with a portion embedded in the filler; substantially as described.

HENRY H. EDWARDS.

CERTIFICATE OF CORRECTION.

Patent No. 2,073,963.  March 16, 1937.

HENRY H. EDWARDS.

It is hereby certified that error appears in the above numbered patent requiring correction as follows: In the heading to the printed drawing, name of inventor, for "H. H. EWARDS" read H. H. EDWARDS; and that the said Letters Patent should be read with this correction therein that the same may conform to the record of the case in the Patent Office.

Signed and sealed this 25th day of May, A. D. 1937.

(Seal)

Henry Van Arsdale
Acting Commissioner of Patents.

sealing device embedded in the filler; substantially as described.

3. In a bearing, a race ring having a filling slot, a filler of soft material fitting in the slot, a sealing washer secured to the race ring, and a portion of the rim of the washer being embedded in the filler; substantially as described.

4. In a bearing, a race ring having a filling slot leading to a raceway groove, a filler comprising an elongated slug adapted to enter the filling slot lengthwise, and the filler having a head arranged at an angle to the body portion to limit entry of the slug into the slot and to hold the inner end thereof spaced from the raceway groove, and the bearing being closed by a sealing washer having a portion of its periphery embedded in the filler; substantially as described.

5. In a bearing, a filling slot filler comprising an elongated slug of curved cross section adapted to enter a filling slot lengthwise, the slug being of soft metal, and the bearing having an end sealing washer embedded in the slug; substantially as described.

6. In a bearing, a race ring having a transverse filling slot leading to a raceway, the ring also having a peripheral groove opening into the slot, a filler of soft material entering the slot and terminating short of the raceway, and a sealing device closing the end of the bearing and expanded into the groove with a portion embedded in the filler; substantially as described.

HENRY H. EDWARDS.

CERTIFICATE OF CORRECTION.

Patent No. 2,073,963.                                 March 16, 1937.

HENRY H. EDWARDS.

It is hereby certified that error appears in the above numbered patent requiring correction as follows: In the heading to the printed drawing, name of inventor, for "H. H. EWARDS" read H. H. EDWARDS; and that the said Letters Patent should be read with this correction therein that the same may conform to the record of the case in the Patent Office.

Signed and sealed this 25th day of May, A. D. 1937.

(Seal)

Henry Van Arsdale
Acting Commissioner of Patents.

CERTIFICATE OF CORRECTION.

Patent No. 2,073,963.                                                                  March 16, 1937.

HENRY H. EDWARDS.

It is hereby certified that error appears in the above numbered patent requiring correction as follows: In the heading to the printed drawing, name of inventor, for "H. H. EWARDS" read H. H. EDWARDS; and that the said Letters Patent should be read with this correction therein that the same may conform to the record of the case in the Patent Office.

Signed and sealed this 25th day of May, A. D. 1937.

(Seal)                                                  Henry Van Arsdale
                                                      Acting Commissioner of Patents.